W. V. TURNER.
FLUID PRESSURE BRAKE.
APPLICATION FILED MAR. 9, 1917.
1,281,433.
Patented Oct. 15, 1918.
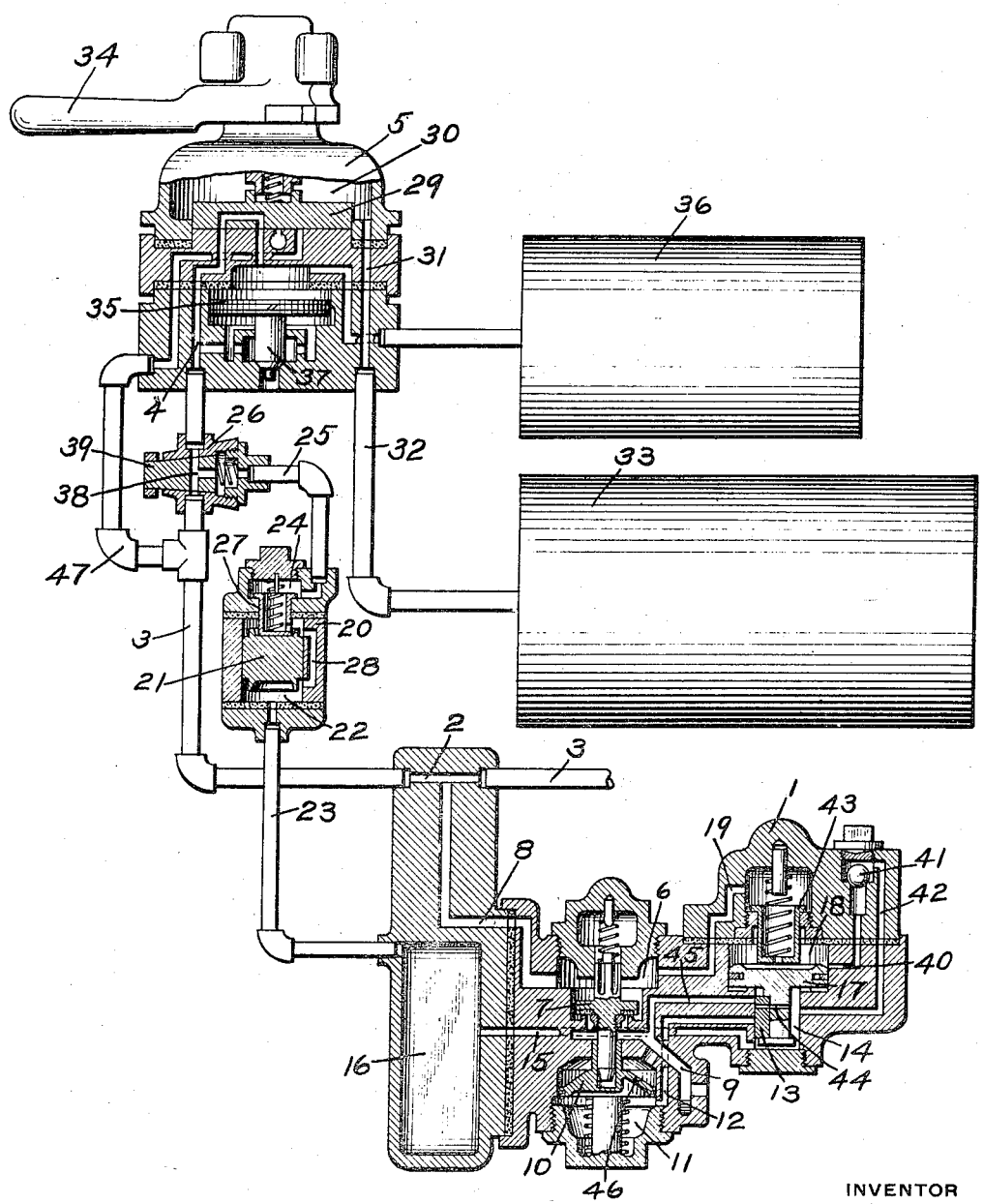
INVENTOR
Walter V. Turner.
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,281,433.

Specification of Letters Patent. Patented Oct. 15, 1918.

Application filed March 9, 1917. Serial No. 153,544.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to an automatic fluid pressure brake system.

In an automatic fluid pressure brake, valve devices are employed in which there is a piston subject to the opposing pressures of the brake pipe and a chamber, adapted to be charged from the brake pipe, such as triple and brake pipe vent valve devices.

With a device of the above character, when the brake valve is turned to full release position, fluid is supplied to the brake pipe at a rapid rate which is liable to charge the chamber of the valve device to a higher degree of pressure than is the case farther back in the train and if the brake valve is then turned to running position, the reduced rate of flow to the brake pipe is apt to produce such a differential pressure between the chamber and the brake pipe on the valve device at the head end, as to cause same to move to emergency position when not intended.

The principal object of my invention is to provide means for preventing movement of a valve device of the above character to emergency position under fluctuations in brake pipe pressure produced in releasing the brakes, while insuring emergency action upon an emergency reduction in brake pipe pressure.

In the accompanying drawing, the single figure is a diagrammatic view, mostly in section, of a fluid pressure brake apparatus embodying my invention.

According to the construction shown in the drawing, my invention is illustrated as applied in connection with a brake pipe vent valve device 1, having a passage 2 forming part of the usual automatic brake pipe 3, which is connected to a passage 4 in a brake valve device 5.

The vent valve device 1 may comprise a casing having a valve chamber 6 containing a brake pipe vent valve 7 for venting fluid from brake pipe passage 2 through a passage 8 to an exhaust passage 9. The vent valve 7 is adapted to be operated by a quick action piston 10 contained in piston chamber 11 which is connected to a passage 12, leading to the seat of an emergency slide valve 13.

The emergency slide valve 13 is contained in a valve chamber 14 connected by passage 15 to a chamber 16 and is operated by a piston 17 contained in piston chamber 18, which is connected by a passage 19 with vent valve chamber 6 and consequently to the brake pipe.

According to my invention, a cut off check valve device 20 is provided, comprising a casing containing a double seating check valve 21, having the chamber 22 at one side connected by pipe 23 with chamber 16 of the vent valve device and having chamber 24 at the opposite side connected by pipe 25 with a cut out cock 26 interposed in the brake pipe 3.

A spring stop 27 tends to maintain the check valve 21 in normal position, as shown in the drawing, in which a by-pass port 28 connects the chambers 22 and 24.

The brake valve device 5 may be of the usual construction having a rotary valve 29 contained in valve chamber 30 connected by passage 31 and pipe 32 with main reservoir 33 and adapted to be operated by a handle 34 and may be provided with the usual equalizing discharge piston 35 subject on one side to the pressure of an equalizing reservoir 36 and connected on the opposite side to brake pipe passage 4 and adapted to operate a discharge valve 37.

In operation, the cut out cock 26 being turned to open position at the operating brake valve, upon initially charging the brake pipe, fluid is supplied to the brake pipe and also through the branched passage 38 of the plug valve 39 to pipe 25 and the check valve is thereby shifted to its vent valve seat, closing the by-pass passage 28, so that fluid can be supplied to the chamber 16 only through the vent valve device.

Fluid supplied through the brake pipe 3 to the vent valve device 1 flows through passage 8, valve chamber 6, and passage 19 to piston chamber 18 and thence through passage 40, past check valve 41 to passage 42 and valve chamber 14. Said valve chamber and chamber 16 are thus charged with fluid under pressure.

If the brake pipe is charged at a high rate, as where the brake valve is turned to release position, the valve chamber 14 and chamber 16 may become overcharged from the brake pipe, but this will do no harm, for according to my invention, upon movement of the brake valve to running position, when the rate of flow to the brake pipe is reduced, the higher pressure in chamber 16 acting in chamber 22 of the check valve device will overcome the lower brake pipe pressure in chamber 24, so that the check valve 21 will be shifted to engage the spring stop 27 and open the by-pass port 28, thus permitting the higher pressure in chamber 16 to equalize into the brake pipe. The accidental movement of the emergency piston 17 to emergency position is thus prevented. If the rate of reduction in brake pipe pressure should exceed the capacity of the by-pass port 28 to reduce the pressure in chamber 16, the piston 17 may be shifted to service position, in which the piston engages a spring stop 43. In this position, a port 44 in the slide valve 13 registers with passage 45, leading to exhaust passage 9, so that fluid is vented from valve chamber 14, to further assist in preventing the movement of the emergency valve to emergency position.

If an emergency reduction in brake pipe pressure is effected, the rate of reduction is so rapid, that the capacity of the by-pass port 28 is much exceeded, and the pressure in chamber 16 will move the check valve 21 to its brake pipe seat against the resistance of the spring stop 27, thus closing the by-pass port, so that the pressure in valve chamber 14 and chamber 16 is not reduced, and as a result, the emergency piston 17 is shifted to emergency position against the resistance of the spring stop 43. In this position, the slide valve 13 uncovers passage 12, so that fluid under pressure is supplied from valve chamber 14 to quick action piston chamber 11, operating the piston 10 so as to open the vent valve 7 and vent fluid from the brake pipe to the exhaust passage 9.

When the pressure in valve chamber 14 and chamber 16 has reduced through an equalizing port 46 in piston 10, to a predetermined degree, the quick action piston 10 will return to normal position and the vent valve 7 to the closed position.

It is not necessary to have the cut off check valve operate except near the operative brake valve, and consequently, the brake pipe connection to the check valve is made through the brake pipe cut out cock 26, so that when the cut out cock is turned to the closed position at the non-operating brake valves, as is usual, the brake pipe is also cut off from the cut off check valve device.

A by-pass pipe 47 around the cut-out cock 26 may be provided, so that in case the cut-out cock should accidentally be left closed at the operating brake valve, an emergency reduction in brake pipe pressure through the by-pass pipe may still be obtained, by manipulation of the brake valve.

Having now described my invention, what I claim as new and desire to secure by Letters Patent, is:—

1. In a fluid pressure brake, the combination with a brake pipe and a valve device subject to the opposing pressures of the brake pipe and a chamber, of means subject to the opposing pressures of the brake pipe and said chamber and operated upon a reduction in brake pipe pressure for venting fluid from said chamber.

2. In a fluid pressure brake, the combination with a brake pipe and a valve device subject to the opposing pressures of the brake pipe and a chamber, of a check valve device subject to the opposing pressures of the brake pipe and said chamber and operated upon a reduction in brake pipe pressure for venting fluid from said chamber and upon a more rapid rate of reduction in brake pipe pressure for preventing the venting of fluid from said chamber.

3. In a fluid pressure brake, the combination with a brake pipe and a valve device subject to the opposing pressures of the brake pipe and a chamber, of a check valve device subject to the opposing pressures of the brake pipe and said chamber and operated upon a reduction in brake pipe pressure for venting fluid from said chamber to the brake pipe.

4. In a fluid pressure brake, the combination with a brake pipe and a valve device subject to the opposing pressures of the brake pipe and a chamber adapted to be charged from the brake pipe, of a yielding stop and a check valve device subject to the opposing pressures of the brake pipe and said chamber and operated upon a reduction in brake pipe pressure to engage said stop and vent fluid from said chamber and movable upon a more rapid reduction in brake pipe pressure against the resistance of said stop to prevent the venting of fluid from said chamber.

5. In a fluid pressure brake, the combination with a brake pipe and a chamber adapted to be charged from the brake pipe, of a check valve subject to the opposing pressures of the brake pipe and said chamber and adapted to seat in opposite directions, a yielding stop device for engaging said check valve in a position intermediate the seating positions, and a by-pass port for connecting opposite sides of the check valve in said intermediate position.

6. In a fluid pressure brake, the combination with a brake pipe and a chamber adapted to be charged from the brake pipe, of means subject to the opposing pressures of the brake pipe and said chamber and operated upon a reduction in brake pipe pressure for venting fluid from said chamber, and a brake pipe cut out cock for connecting the brake pipe to said means and adapted in the closed position to cut off the brake pipe therefrom.

7. In a fluid pressure brake, the combination with a brake pipe and a brake pipe vent valve device comprising a piston subject to the opposing pressures of the brake pipe and a chamber adapted to be charged from the brake pipe and a valve operated by said piston for effecting a reduction in brake pipe pressure, of a check valve device subject to the opposing pressures of the brake pipe and said chamber and operated upon a reduction in brake pipe pressure less than the emergency rate of reduction for venting fluid from said chamber.

In testimony whereof I have hereunto set my hand.

WALTER V. TURNER.